(12) United States Patent
Smilansky et al.

(10) Patent No.: US 10,984,536 B2
(45) Date of Patent: Apr. 20, 2021

(54) MOTION DETECTION IN DIGITAL IMAGES AND A COMMUNICATION METHOD OF THE RESULTS THEREOF

(71) Applicant: EMZA VISUAL SENSE LTD, Givatayim (IL)

(72) Inventors: Zeev Smilansky, Meishar (IL); Tal Hendel, Tel Aviv (IL); Tomer Kimhi, Tel Aviv (IL)

(73) Assignee: EMZA VISUAL SENSE LTD, Givatayim (IL)

( * ) Notice: Subject to any disclaimer, the term of this patent is extended or adjusted under 35 U.S.C. 154(b) by 106 days.

(21) Appl. No.: 16/255,869

(22) Filed: Jan. 24, 2019

(65) Prior Publication Data

US 2019/0228532 A1   Jul. 25, 2019

Related U.S. Application Data

(60) Provisional application No. 62/621,612, filed on Jan. 25, 2018.

(51) Int. Cl.

| *G06K 9/62* | (2006.01) |
| *G06K 9/00* | (2006.01) |
| *G06T 7/246* | (2017.01) |
| *G06T 1/00* | (2006.01) |
| *G06T 1/20* | (2006.01) |

(52) U.S. Cl.
CPC ............ *G06T 7/246* (2017.01); *G06K 9/6212* (2013.01); *G06T 1/0007* (2013.01); *G06T 1/20* (2013.01); *G06T 2207/30242* (2013.01)

(58) Field of Classification Search
None
See application file for complete search history.

(56) References Cited

U.S. PATENT DOCUMENTS

| 2013/0058579 A1* | 3/2013 | Kawanishi | ............ G06F 16/583 |
| | | | 382/195 |
| 2015/0117708 A1* | 4/2015 | Guigues | .................. G06T 7/246 |
| | | | 382/103 |

(Continued)

*Primary Examiner* — Randolph I Chu
(74) *Attorney, Agent, or Firm* — Soroker Agmon Nordman (57) ABSTRACT

The present invention discloses a method operable on a digital electronic device comprising an ISP, for initiating a motion diagnostic process on digital images captured by a sensor, and an image sensor. The method operable on a digital electronic device may also be designed to comprise additional steps such as reading a digital image stored in a memory unit, wherein the ISP is configured with computerized instructions comprising instructions to identify regions in the digital image, operating a hot region detection process to detect hot regions among the identified regions, creating a hot region map representing the hot regions detected among the identified regions, and then allowing the requester access to the captured hot region map via communicating with the memory unit, wherein said access allows the requester to perform a motion detection on the digital image. In some cases, the ISP or the digital electronic device may conduct a motion detection on the detected hot regions. Such an analysis may comprise a motion detection, classification process, and the like. In some cases, the requester may be an external device.

20 Claims, 6 Drawing Sheets

(56) References Cited

U.S. PATENT DOCUMENTS

| | | | |
|---|---|---|---|
| 2015/0117784 A1* | 4/2015 | Lin | G06K 9/4671 |
| | | | 382/195 |
| 2015/0125074 A1* | 5/2015 | Yu | G06T 7/194 |
| | | | 382/164 |
| 2015/0169982 A1* | 6/2015 | Perry | G06K 9/6256 |
| | | | 382/195 |
| 2015/0170006 A1* | 6/2015 | Cohen | G06K 9/6297 |
| | | | 382/180 |
| 2016/0092738 A1* | 3/2016 | Laska | H04L 67/10 |
| | | | 382/103 |
| 2017/0257576 A1* | 9/2017 | Mitsui | H04N 5/272 |
| 2017/0300938 A1* | 10/2017 | Sakata | G06Q 50/10 |
| 2019/0019285 A1* | 1/2019 | Matsumoto | G06Q 10/087 |

* cited by examiner

MOTION DETECTION IN DIGITAL IMAGES AND A COMMUNICATION METHOD OF THE RESULTS THEREOF

FIELD OF THE INVENTION

The present invention relates to digital devices utilized for interpreting images through visual analysis, and more particularly to digital devices designed to perform motion detection on images by using an image signal processor, and communicate the results of the motion detection to a third party.

BACKGROUND OF THE INVENTION

As of today, small electronic detectors and imaging sensors performing motion detection, need to utilize larger systems that perform the computationally intensive parts of the motion detection analysis. A popular approach is to integrate a processing unit which preforms the motion detection by comparing a digital image to a previously captured digital image. The processing unit preforming the motion detection can identify the motion by comparing two digital images. The comparison can first identify pixels which may indicate motion in a detected area captured by the digital image. In some cases, based on the results of the analysis, the processing unit can perform further tasks and/or create alerts in accordance with the application's requirements. Such tasks of the application can comprise: people counting, people sensing, intruder detection, face detection, gesture recognition, distinction between people by age or gender, protection of identified population in a certain area, and the like.

In some cases, the image sensor comprises a digital system which can capture an image or image sequence and send the images to a human reviewer or to a computerized analysis module of the system. In such cases, the digital system is continuously required to be in operational mode, waiting for images to be received for the analysis process. In some cases, there is a need to maintain complex systems which can comprise computing units, communication means, user interfaces, and other peripheral components. Such systems are often complex, costly, and consume considerable power.

SUMMARY OF THE INVENTION

The present invention discloses a method operable on a digital electronic device comprising an Image Signal Processor (ISP), for initiating a motion diagnostic process on digital images captured by a sensor, and an image sensor. The method disclosed in the present invention may also communicate the results of the detection process with a third-party device, denoted herein as a requester, wherein the requester compares a digital processor. In some cases, ISP may be configured to communicate with the image sensor and receive images therefrom. Such an image sensor can comprise a photosensitive cell array designed to transduce optical image of objects formed on the photosensitive cell array by incidence of light, into corresponding electronic signals, denoted herein as a digital image, representing the image captured by the image sensor. For example, an ISP may receive electronic signals from a CMOS image sensor and convert the electronic signals into a computer-readable image, marked as the digital image.

In some embodiments of the present invention a digital electronic device comprising an ISP coupled with a memory unit designed to communicate with a requester may be utilized to initiate a motion diagnostic process on digital images. In such cases, the ISP can be further designed to read a digital image stored in a memory unit, wherein the ISP is configured with computerized instructions comprising instructions to identify regions in the digital image, operate a hot region detection process to detect hot regions among the identified regions, create a region map, denoted as a hot region map, representing the hot regions detected among the identified regions, and then allow the requester access to the captured hot region map via communicating with the memory unit, wherein said access allows the requester to perform a motion detection on the digital image.

In some cases, the ISP may be configured to receive the digital image via accessing the memory unit. In some cases, the ISP may also be configured to read a digital image from the image sensor. The ISP may be also configured to map the pixels of said digital image to a number of pixel arrays denoted herein as regions, wherein a single region comprises one or more pixels of the digital image. The initiation of the motion diagnostic method disclosed in the present invention may also comprise some processes configured to detect regions of the digital image defined as hot regions. A hot region herein is defined as a region detected to be lighter or darker or more generally with a different distribution of gray levels than the corresponding region of another image captured earlier. In some cases, the hot regions may be determined by measuring the region statistics of a region and comparing these region statistics with the region statistics of another region. In some cases, such another region may be a corresponding region in a digital image previously captured.

The region statistics can comprise values representing the amount of light acquired by the pixels. The region statistics may also comprise the values of the grayscale levels of the region. In some cases, such values may be the sum or the average of the grayscale levels in a region. In some other cases, the region statistics can comprise values such as the median value, variance value, histogram values, maximum value, minimum value, and the like, of the grayscale levels in a certain region. Thus, the ISP may be configured to represent the regions of a digital image by a value, or in some cases values, representing region statistic of the regions. For example, a region may be represented by the median value of the grayscale levels of the pixels in a specific region. Another example may be with an ISP instructed to sum the grayscale levels of the pixels in a region.

The ISP may also be configured to choose a single region, denoted here as a probed region, and execute a set of instructions to determine whether the probed region is a hot region. In such cases, the ISP may be instructed to individually compare the region statistics of a probed region with the region statistics of another region. For example, the ISP may compare the region statistics of a probed region with the region statistics of a previously created region, wherein the previously created region resides at the corresponding location on a previously produced image.

In some cases, the ISP may be instructed to compare between grayscale levels of a region and the grayscale level in the corresponding location at the previously produced image. In some cases, the ISP may compute the average grayscale level in a region and then compare the average grayscale level with the corresponding location at the other region. In some cases, the ISP may also be instructed to create a hot region map, which in some cases may be stored in a memory unit located externally to the digital electronic device. The hot regions can be represented by a value in said hot region map, denoted herein as a hot region value. For example, a hot region can be represented in the hot region map by at least one single value indicating that said region may be different from the corresponding previous regions in some statistical measure. In some cases, the ISP may also be configured to count the number of hot regions in the hot region map, compare the count value with a predefined threshold value, and in case the count value meets a certain criterion set a flag bit indicating that the digital image comprises at least one hot region.

In some cases, the ISP may also initiate a process, denoted herein as a hot region protocol, in order to communicate the hot region information with a requester which may be a third-party device. In some cases, such hot region information may comprise at least a portion of following: The number of hot regions detected, the regions statistics, the flag bit, the hot region map, or any combination thereof. For example, the hot region information may comprise the region statistics. Thus, the ISP may send the value of the flag bit to a requester, and then, the ISP may also count hot region value and send to the requester. In some cases, the requester may send to the ISP a request to receive the region statistics associated with the regions of the digital image. Upon receiving the request to receive the region statistics, the ISP may send the requester the region statistics. Then, in some cases, the ISP may receive a request for sending the hot region map. In some cases, the requester may be a computerized device such as a mobile telephone, a computer, a server, a tablet personal computer, a computer embedder device, a camera device, and the like.

In some cases, the ISP may receive the request and send the hot region map to the requester. In some other cases, upon sending the hot region map, the ISP may also allow access to an external memory unit by the requester. In some cases, the hot region information, and the hot region map may be stored in said memory unit. Thus, the requester may access the memory unit in order to utilize the hot region information, the hot region map, and the like. In some cases, as a result of processing the hot region information, the requester may request the next image which may be captured by the image sensor.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a method operable on a digital electronic device comprising an ISP, for initiating a motion diagnostic process on digital images captured by a sensor, and an image sensor. The method disclosed in the present invention may also conduct a communication process to communicate the results of the detection process with a requester. The method operable on a digital electronic device may also be designed to comprise additional steps such as reading a digital image stored in a memory unit, wherein the ISP is configured with computerized instructions comprising instructions to identify regions in the digital image, operating a hot region detection process to detect hot regions among the identified regions, creating a hot region map representing the hot regions detected among the identified regions, and then allowing the requester access to the captured hot region map via communicating with the memory unit, wherein said access allows the requester to perform a motion detection on the digital image.

In some possible embodiments of the present invention, it was the intention of the inventor to allow a comparison of two digital images under conditions of low power. Thus, the present invention can be configured to allow hot regions identification by the ISP consuming relative low power, and then grant access permissions to a computerized device such as a requester, allowing the requester to remain in a state of deep sleep reducing significantly the power consumed whenever the number of hot regions is under a given threshold. In some cases, the ISP or the digital electronic device may conduct a motion detection on the detected hot regions. In some cases, the ISP may conduct the hot region detection process as aforementioned and the requester may utilize the detected hot region for additional analysis. Such an additional analysis may comprise a motion detection, classification process, and the like. In some cases, the requester may be an external device. Thus, the requester may be communicating with an electronic device comprising the ISP over telecommunication networks.

Figure 1:
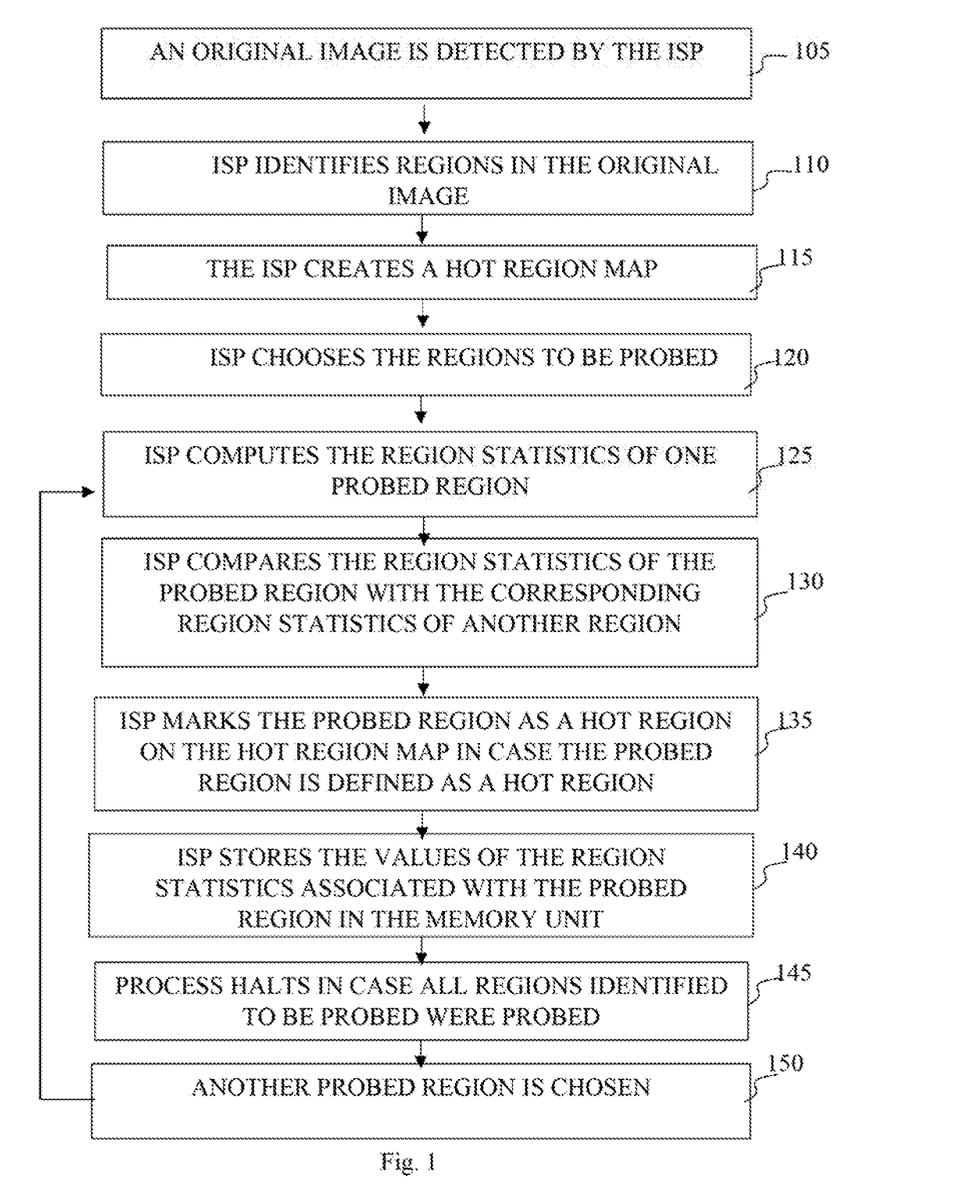
FIG. 1 discloses a method, denoted as Hot Region Detection, defined to detect hot regions in a digital image, according to exemplary embodiments of the present invention.

FIG. 1 discloses a method, denoted as Hot Region Detection, defined to detect hot regions in a digital image, according to exemplary embodiments of the present invention. At step 105 a digital image which can reside as pixel data in the image sensor may be detected by an ISP. At step 110 the ISP defines regions out of the digital image. Such regions may be created by dividing the digital image to a number of sub-arrays, or in any other way defining a set of one or more sub-arrays. Such regions need not cover the digital image nor be similar in size or shape to each other. In some cases, each region may comprise one pixel of the digital image. In some other cases, the region may comprise two or more pixels. In some embodiments of the present invention, the region definition may be formed by mapping the digital image to reduced resolution regions. For example, a digital image in a resolution of VGA can be mapped by the ISP into reduced resolution images at a resolution of QQQVGA in regions containing an array of 8×8 pixels.

In some embodiments of the present invention, the creation of the regions may be such that the number of regions may be suitable to the amount of the operational memory embedded in the ISP, utilized for temporary storage of data expected to be reused. In some cases, the process of creating the regions may be performed by accessing the pixel data as the pixel is captured by the image processor, and using the measured value of the pixel to adjust and update the region statistic of the corresponding region. In some cases, the ISP may be configured to store the value or values representing the region statistic of the regions in the ISP embedded memory. For example, in a process wherein the ISP reads the pixels of a digital image, the ISP may read the grayscale level of a pixel, identify the address of the pixel at the entire digital image and use the grayscale level to adjust and update the cumulative value representing the region.

In some cases, the ISP may be configured to define more than one value in order to maintain the region statistics. For example, the ISP may define two values to maintain the region statistics a single region. One value may be a cumulative value of the grayscale levels and value may be the standard variation of the grayscale levels of the pixels in the region.

At step 115 the ISP creates a hot region map, wherein the hot regions can be represented by at least one single value. For example, a hot region may be represented in the hot region map by a hot region value equals to one (1). In some cases, the hot region value may comprise one bit. For example, a hot region may be represented in the hot region map by a single bit in status on, also known as a single bit equals to one (1). In some cases, upon creation of the hot region map, all the values in the map may be equal to zero. At step 120 the ISP may be instructed to choose the regions to be probed in a hot region identification process, wherein the hot region identification process can be configured to determinate whether said regions can be labeled or defined as hot regions. In some cases, the regions to be probed may comprise a part of the regions mapped from the digital image. In some other cases, the regions to be probed may comprise all of the regions mapped from the digital image.

At step 125 the ISP may compute the region statistics of one probed region which may be one region of the regions which undergo identification process. In some embodiments of the present invention, the region statistics may comprise the value of the average grayscale level of the probed region. In some cases, the region statistics may comprise the sum of the grayscale level in a region. In some other cases, the region statistics can comprise values such as the median value, variance value, maximum value, minimum value, histogram values and the like, of the grayscale levels in the region. For example, the ISP may compute the region statistics by calculating the average value of the grayscale levels in the probed region. In some aspect of the present invention, the process of computing the region statistics of a probed region may involve summing the grayscale levels of the pixels in the probed region. For example, the ISP may be instructed to sum the values of the grayscale levels of the pixels in a region. In some cases, the region statistics may be associated with the probed region.

At step 130 the ISP may be instructed to probe the probed region by comparing the region statistics of the probed region with the region statistics of another region. For example, the region statistics of the probed region can be compared with region statistics of a previously created region, where in some cases, the region statistics of a previously created region may be stored in the memory unit. Another example may be, a certain average grayscale value may be associated with the grayscale values of a probed region of an 8×8 array of pixels.

In some cases, wherein the region statistics of the probed region are different from the region statistics of another region such as a corresponding previously created region, the probed region may be denoted as a hot region. In some other cases, wherein the difference between the region statistics of the probed region and the region statistics of another region exceeds a predefined threshold value, the probed region may be denoted as a hot region. The threshold value may be a global threshold value for all the regions undergoing Hot Region Detection. In some cases, the threshold value may be a separated value for each region. In some other cases, the threshold may be associated with brightness of the region, with the time captured the image, and the like. In some cases, the region statistics of another region may be stored in a memory unit located externally to the digital electronic device, as explained below.

At step 135 the ISP may complete to probe the probed region. In such cases, wherein the probed region is a hot region, the ISP may assign a hot region label on the hot region map. For example, in case a hot region associated with a hot region is equal to one (1), the probed region may be represented with the value one (1) in the hot region map.

At step 140 the ISP stores the value, or in some cases, the values of the region statistics associated with the probed region. At step 145 the ISP halts the Hot Region Detection in case all of the regions in the regions to be probed have completed the hot region identification process, otherwise the Hot Region Detection continues. At step 150 another region is chosen to be probed. In such a case, the newly chosen region may be denoted as the probed region and initiate the Hot Region Detection from step 125. In some embodiments of the present invention, some computerized instructions operable by the ISP may be executed to manage the region selection in the regions which undergo hot region identification process. For example, a computerized instruction may be configured to select an image by utilizing a serial number or a numeric order to choose the newly chosen region and denote thereof as the probed region.

Figure 2:
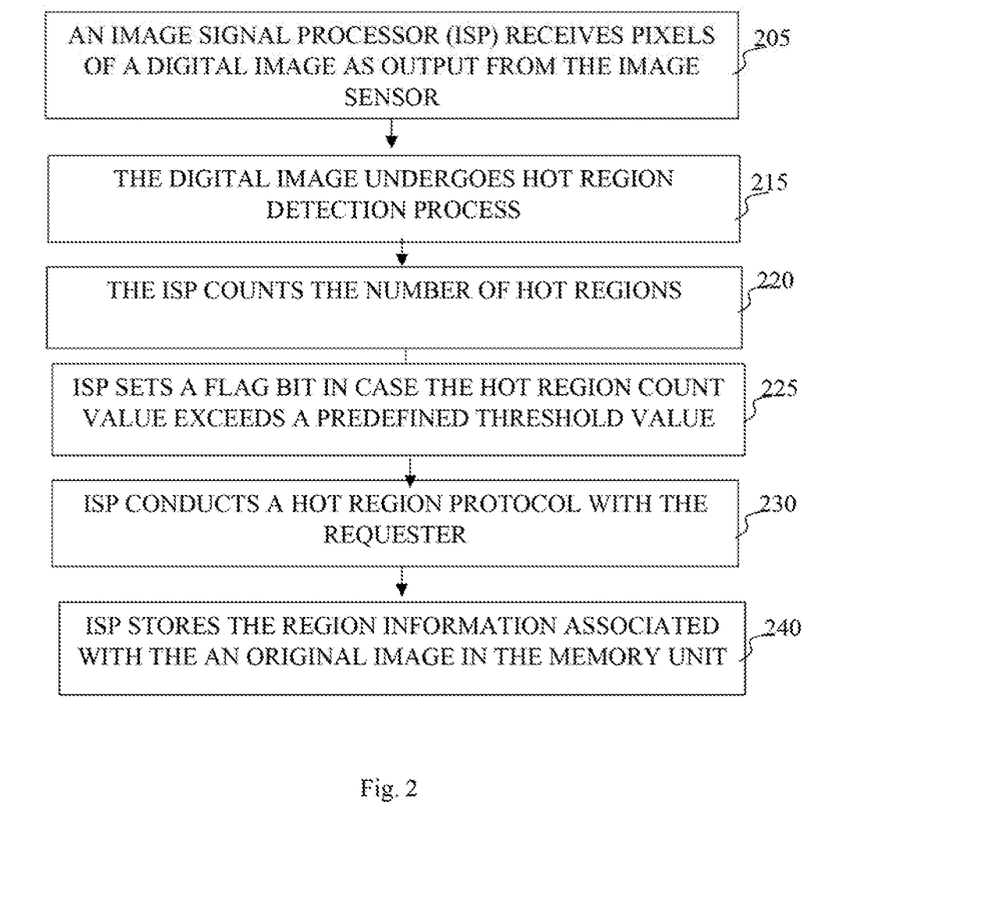
FIG. 2 discloses a method to detect motions in a digital image and communicate the results, according to exemplary embodiments of the present invention.

FIG. 2 discloses a method to detect motions in a digital image and communicate the results, according to exemplary embodiments of the present invention. At step 205 an ISP receives pixels of a digital image as output from an image sensor as aforementioned. In some cases, the digital image may be a snapshot of a camera or a video camera frame, wherein a single image may be one (1) still image of a complete moving picture.

At step 215 the ISP initiates a process implementing the Hot Region Detection method, wherein hot regions can be identified on regions defining the digital image, and be represented on the hot region map, as aforementioned. At step 220 the ISP may count the hot region values in the hot region map. For example, in case two or three regions are represented in the hot region map by hot region values, the ISP may count the number of the hot region values.

At step 225 the ISP may set a flag bit in case the accumulated number of hot regions in the hot region map exceeds a predefined threshold value. In some cases, such a flag bit may be a single bit indicator indicating that the regions of the digital image comprise hot regions. In some other cases, the flag bit may comprise more than one bit. The ISP may count the number of the hot regions comprising the numeric value, and in case the count value of the hot regions in the hot region map exceeds the predefined threshold value, a flag bit is set with a value. For example, the flag bit can be set to comprise the value one. In some cases, the flag bit may comprise a numeric value in case the count value of the hot region value in the hot region map exceeds the threshold value. For example, in case a hot region map comprises three (3) hot regions as a result of the Hot Region Detection, the count value of the hot region value is three (3). In such an exemplary case, if the threshold value for the hot region value is smaller than three (3), the flag bit may comprise a predefined numeric value indicating that some of the regions representing the digital image are hot regions.

At step 230 the ISP conducts a hot region protocol in order to send the hot region information to a requester. At step 240 the ISP stores the hot region information located in the memory unit as hot region information of the previous regions.

Figure 3:
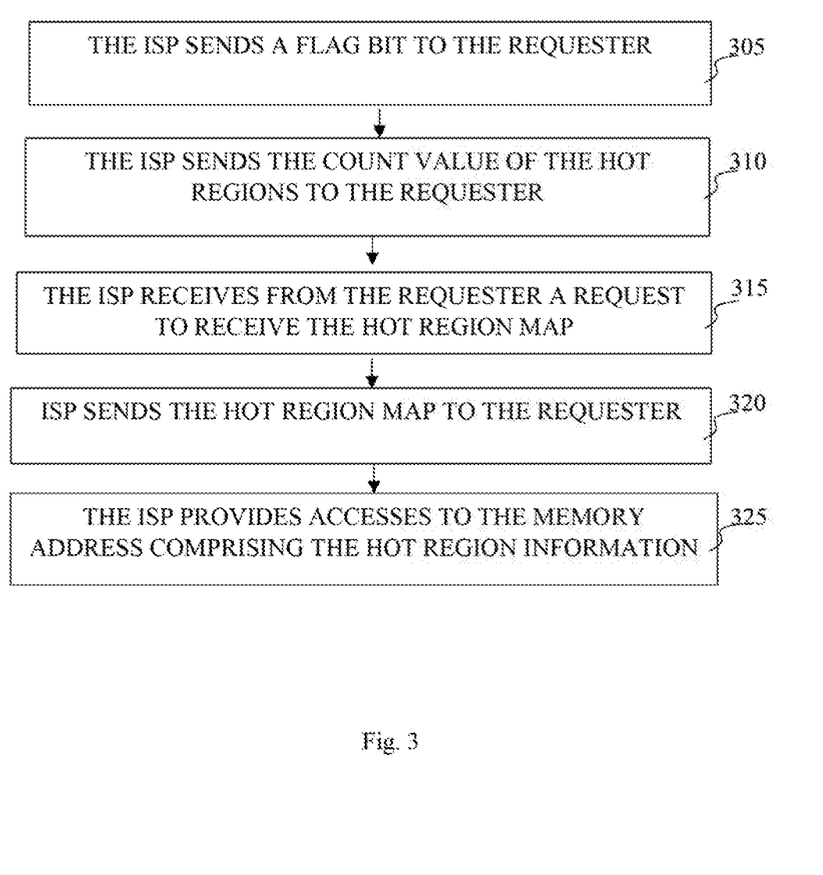
FIG. 3 discloses the hot region protocol for communicating between an ISP and a requester comprising a digital processor, according to exemplary embodiments of the present invention.

FIG. 3 discloses the hot region protocol for communicating between an ISP and a requester comprising a digital processor, according to exemplary embodiments of the present invention. At step 305 the ISP sends a flag bit to a requester. The flag bit may comprise a predefined value indicating that the regions representing the digital image comprise hot region. At step 310 the ISP may send the hot region count value to the requester. For example, in case a hot region map comprises a certain number of hot regions, said number of the hot region may be sent by the ISP to the requester.

At step 315 the ISP may receive from the requester a request to receive the region map of the regions representing the digital image. At step 320 upon receiving a request from the requester to receive the hot region map, the ISP may send the hot region map to the requester. At step 325 the ISP may provide access to the memory address comprising the hot region information. The ISP may receive a request from the requester to send the next image captured by the image sensor, to the requester.

Figure 4:
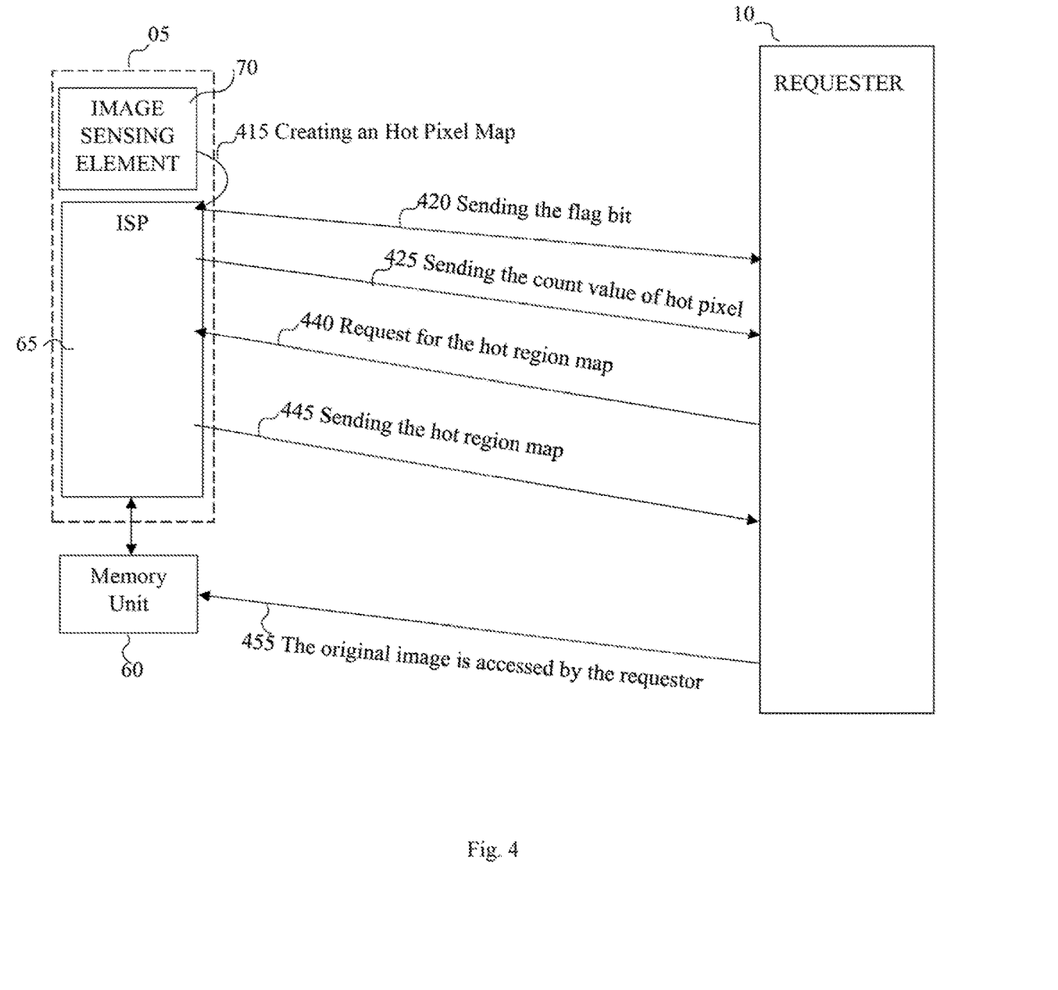
FIG. 4 discloses a sequence events of the hot region protocol between an ISP and a requester, according to exemplary embodiments of the present invention.

FIG. 4 discloses a sequence of events of the hot region protocol between an ISP and a requester, according to exemplary embodiments of the present invention. FIG. 4 shows an ISP 65 communicating with a requester 10. FIG. 4 shows a digital electronic device 05 comprises an ISP 65 and image sensing element 70. In some cases, the ISP 65 can also be configured to communicate with a digital memory unit 60, The ISP 65 can detect images captured in light incidents on an image sensor 70. Thus, the ISP 65 may perform some computerized processes which embodies the Hot Region Detection, and the setting of the flag bit, as aforementioned. The ISP 65 may also conduct the process of creating the hot region map 415 before initiating the hot region protocol. Thus, at step 420 the ISP 65 can conduct the process of sending the flag bit to a requester 10. In some cases, sending the flag bit 420 may be following a request from the requester 10 to receive the flag bit. The flag bit may comprise a predefined value indicating that the digital image comprises at least one hot region. At step 425 the ISP 65 may send the hot region count value to the requester 10. For example, in case a hot region map comprises a certain number of hot regions, said number of the hot regions may be sent by the ISP 65 to the requester 10. In some embodiments of the present invention, step 425 of sending the hot region count value to the requester 10 may be triggered by a request received by the ISP 65 to send the hot region count value. In some cases, the ISP 65 may send the hot region count value only in case a request for sending the hot region count value is received by the ISP 65.

At step 440, the ISP 65 may receive a request for sending the hot region map. Upon receiving the request for the hot region map, the ISP 65 can send the hot region map. At step 445 the ISP sends the hot region map to the requester. At step 455 the ISP may allow access to the memory unit 60. In some cases, the such an allowing may be by providing sending the memory address to the requester. In some cases, the ISP 65 may locate the region information in memory unit 60.

In some embodiments of the present invention, the ISP may utilize a portion of the steps defined to communicate with a requester. For example, in some cases, the ISP 65 may send the flag bit as defined. At step 420 and halt without continuing the process of sending the other values and information to the requester 10. In some other exemplary cases, the ISP 65 may halt the communication with the requester 10 after sending the hot region count value.

Figure 5:
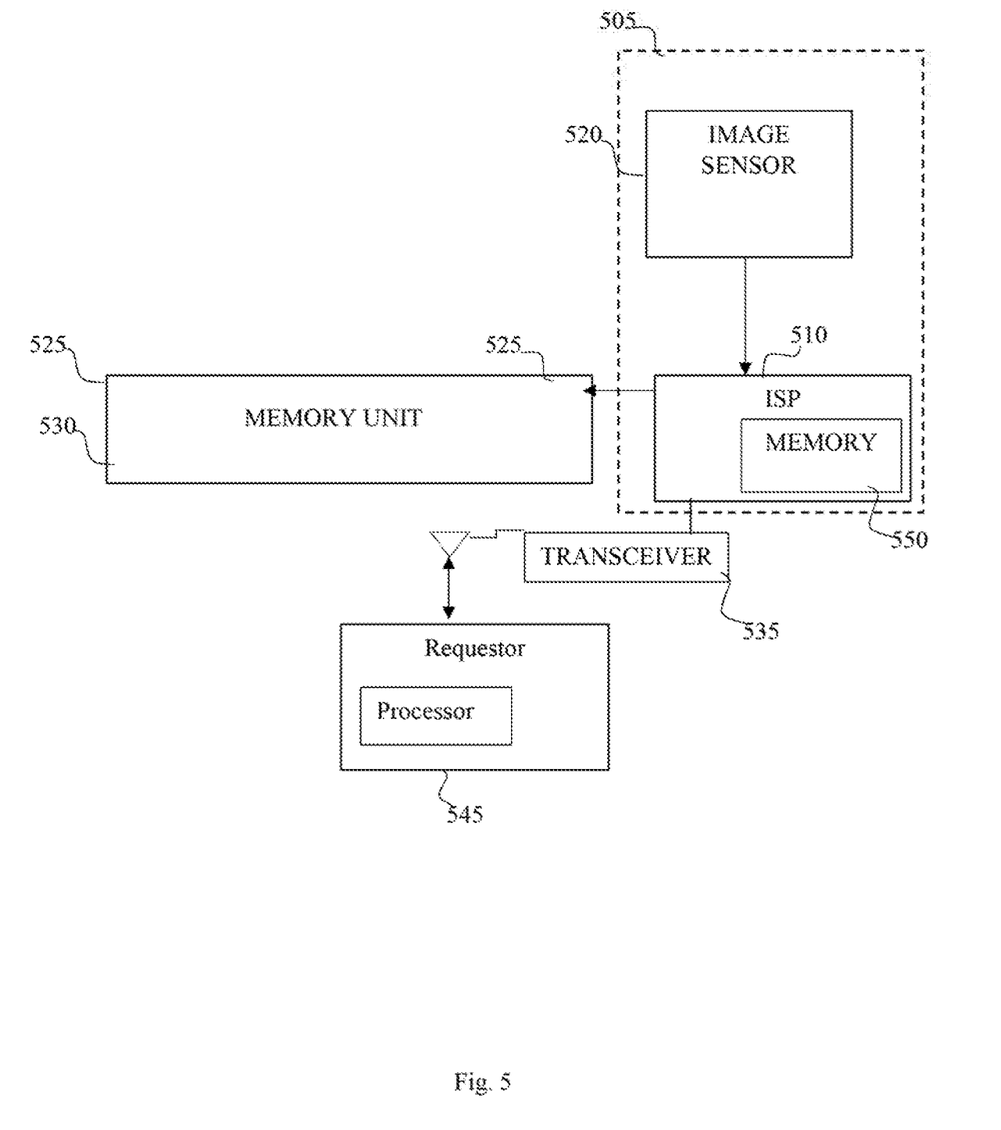
FIG. 5 shows a digital electronic device comprising a processing unit connected to a memory unit, designed to receive an image and conduct a scene analysis, according to exemplary embodiments of the disclosed subject matter.

FIG. 5 shows a digital electronic device comprising a processing unit connected to a memory unit, designed to receive an image and conduct a scene analysis process, according to exemplary embodiments of the disclosed subject matter. FIG. 5 shows a digital electronic device 505 comprises an image sensor 520 and an ISP 510 designed to receive pixels of an image and conduct a Hot Region Detection process thereon. In some other cases, the image may be provided from an image sensor 520 which may be designed to capture incidents of light provided by a camera or a digital video camera. In some cases, the image sensor 520 may comprise a photo sensitive element comprising a plurality of photosensitive units covered on a surface of a transducer.

In some embodiments of the present invention the ISP 510 may be configured with computerized instructions comprising instructions to identify regions in the digital image, operate a hot region detection process to detect hot regions among the identified regions, and create a hot region map representing the hot regions detected among the identified regions. The ISP 510 may also comprise computerized instructions to allow the requester accessing to the captured hot region map via communicating with the memory unit 550. In some cases, the computerized instructions of the ISP 510 may further comprise instructions to count the number of the detected hot regions in the hot region map, after the creation of the hot region map, and then create a count value indicating the number of hot regions, create a flag bit indicating that the digital image comprises at least one hot region, in case the count value is larger than a threshold number, and send the flag bit to a requester 545.

In some cases, the computerized instructions may be resultant of fixed-functions hardwired on Application-Specific Integrated Circuit, also known as ASIC. Such instructions can be designed to execute some computer algorithms to perform image processing on digital images, access the image sensor 520, convert the electrical signals generated by the photosensitive units of the image sensor 520 to digital information, improve or control the quality of the digital image, read data of a digital image, and the like. The ISP 510 may also be configured to execute computerized instructions required for the operations on the digital image. The operations on the digital image may be such as, represent the digital image in regions, create the hot region map, and the like, as aforementioned. The ISP 510 may also comprise a computer-readable digital storage denoted as memory 550 which in some cases, can be utilized by the ISP 510 for temporary storage of data expected to be reused. Such a data can be the regions, the region statistics, and the like. In some cases, the ISP 510 may utilize the memory 550 for storing the region statistics, during the hot region identification process. In some cases, region data such as hot region information, hot region map, and like, may be stored in the memory unit 550. In some cases, the region data stored in the memory 550 may be deleted after the hot region identification process.

In some embodiments of the disclosed subject matter, the ISP 510 also be configured to perform operations such as read and write to an external memory such as a memory unit 525. In some cases, the region statistics of another region may be stored in the memory unit 525. Thus, in some cases, the ISP 510 may be configured to utilize the region statistics of another region may be stored in the memory unit 525 in the Hot Region Detection.

The ISP 510 may also be connected to a transceiver 535 designed to transmit and a receive electrical signals. The ISP 510 may utilize the transceiver 535 to communicate with other devices such as requester 545. In some cases, the ISP 510 may be connected to a receiver and a transmitter implemented in the place of transceiver 535. In some embodiments of the present invention, the ISP 510 may communicate via communication networks connections.

Figure 6:
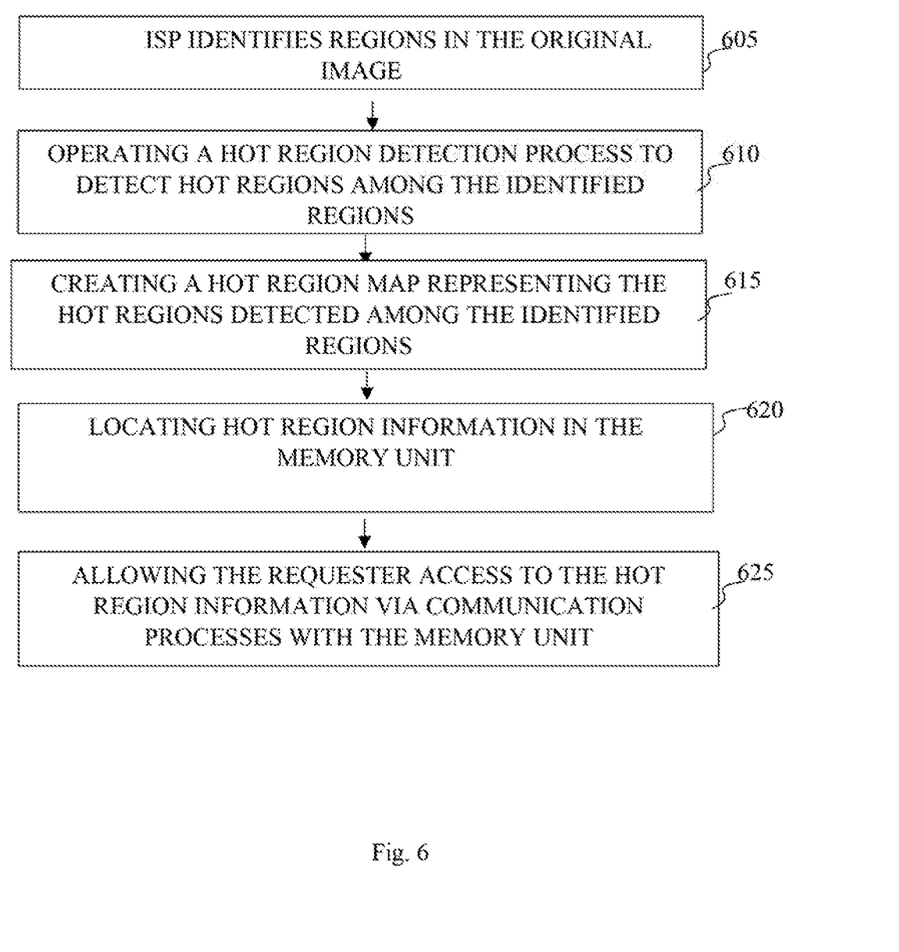
FIG. 6 shows a method operable by an ISP to detect hot regions in a received digital image and communicate the detection information to a requester.

FIG. 6 discloses a method operable by an ISP to detect hot regions in a received digital image and communicate the detection information to a requester. At step 605 the ISP defines regions of the digital image. Such regions may be created by dividing the digital image to a number of sub-arrays, or in any other way defining a set of one or more sub-arrays. Such regions need not cover the digital image nor be similar in size or shape to each other. In some cases, each region may comprise one pixel of the digital image. In some other cases, the region may comprise two or more pixels. In some embodiments of the present invention, the region definition may be formed by mapping the digital image to reduced resolution regions. For example, a digital image in a resolution of VGA can be mapped by the ISP into reduced resolution images at a resolution of QQQVGA in regions containing an array of 8×8 pixels.

At step 610 the ISP initiates a process implementing the Hot Region Detection method, wherein hot regions can be identified on regions defining the digital image, and be represented on the hot region map, as aforementioned. At step 615 the ISP creates a hot region map, wherein the hot regions can be represented by at least one single value. For example, a hot region may be represented in the hot region map by a hot region value equals to one (1). In some cases, the hot region value may comprise one bit. For example, a hot region may be represented in the hot region map by a single bit in status on, also known as a single bit equals to one (1). In some cases, upon creation of the hot region map, all the values in the map may be equal to zero.

At step 620 the ISP stores hot region information in the memory unit. In some cases, such hot region information may comprise at least a portion of following: The number of hot regions detected, the regions statistics, the flag bit, the hot region map, or any combination thereof. In some embodiments of the present invention the ISP may send the hot region map to the requester.

At step 625 the ISP allows the requester accessing to the hot region information, which may be located at a memory unit. In some cases, the such an allowing may be by providing sending the memory address to the requester. In some embodiments of the present invention, the ISP may utilize a portion of the steps defined to communicate with a requester. For example, in some cases, the ISP may send the flag bit and halt without continuing the process of sending the other values and information to the requester. In some other exemplary cases, the ISP may halt the communication with the requester after sending the hot region count value. In some cases, the requester may utilize the access to the hot region map to analyze the hot regions. Such analysis may be a motion detection process, a classification process and the like.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A digital electronic device, comprising:
   an image sensor for capturing images;
   an Image Signal Processor coupled with the image sensor and with a memory unit designed to communicate with a requester,
   wherein the requester is a third party device excluded from the digital electronic device;
   wherein the Image Signal Processor is further designed to read a digital image stored in a memory unit, and wherein the Image Signal Processor is configured with computerized instructions comprising instructions to:
   identify regions in the digital image;
   measure region statistics of multiple regions in the digital image;
   operate a hot region detection process to detect hot regions among the identified regions, wherein the hot region detection process comprises comparing region statistics of regions in the digital image with region statistics of another region in a previous image captured by the digital electronic device;
   create a hot region map representing the hot regions detected among the identified regions;
   store hot region information in the memory unit, wherein the region information comprises the hot region map;
   allow the requester access to the hot region information via a communication process with the memory unit.

2. The digital electronic device of claim 1, wherein the computerized instructions further comprise instructions to count the number of the detected hot regions in the hot region map, after the creation of the hot region map, and then create a count value indicating the number of hot regions, create a flag bit indicating that the digital image comprises at least one hot region, in case the count value is larger than a threshold number, and send the flag bit to a requester.

3. The digital electronic device of claim 1, wherein the region statistics of the regions in the digital image are sent to the requester.

4. The digital electronic device of claim 1, wherein the digital image stored in the memory unit is a digital image captured by an image sensor.

5. The digital electronic device of claim 1, wherein the Image Signal Processor further comprises instructions to send the hot region map to the requester.

6. The digital electronic device of claim 1, wherein the Image Signal Processor is further instructed to map the digital image into a reduced resolution image of the digital image, before preforming the instructions to identify regions in the digital image.

7. The digital electronic device of claim 1, wherein the Image Signal Processor is further instructed to send the hot region map to the requester after sending the flag bit to the requester.

8. The digital electronic device of claim 1, wherein the information located in the memory unit comprises at least a portion of following: The number of hot regions detected, the regions statistics, the flag bit, the hot region map, or any combination thereof.

9. A method operable on a digital electronic device comprising an image sensor for capturing images and an Image Signal Processor coupled with the image sensor and designed to communicate with a requester, wherein the requester is a third party device excluded from the digital electronic device;
wherein the Image Signal Processor is further designed to read a digital image stored in a memory unit, and wherein the method comprising:
identifying regions in the digital image;
measuring region statistics of multiple regions in the digital image;
operating a hot region detection process to detect hot regions among the identified regions, wherein the hot region detection process comprises comparing region statistics of regions in the digital image with region statistics of another region in a previous image captured by the digital electronic device;
creating a hot region map representing the hot regions detected among the identified regions;
storing hot region information in the memory unit, wherein the region information comprises the hot region map;
allowing the requester access to the hot region map via communicating with the memory unit.

10. The method of claim 9, further comprises counting the number of the detected hot regions in the hot region map, after the creation of the hot region map, and then creating a count value indicating the number of hot regions, creating a flag bit indicating that the digital image comprises at least one hot region, in case the count value is larger than a threshold number, and then sending the flag bit to the requester.

11. The method of claim 9, wherein the digital image stored in the memory unit is a digital image captured by an image sensor.

12. The method of claim 9, wherein the region statistics of the regions in the digital image are sent to the requester.

13. The method of claim 9, wherein creating regions in the hot region map further comprises representing the hot regions of the hot region map by at least one numeric value.

14. The method of claim 9, further comprises sending the hot region map to the requester after sending the flag bit to the requester.

15. The method of claim 9, further comprises sending the count value to the requester.

16. The method of claim 9, further comprises creating a count value indicating the number of hot regions.

17. The method of claim 9, wherein the information located in the memory unit comprises at least a portion of following: The number of hot regions detected, the regions statistics, the flag bit, the hot region map, or any combination thereof.

18. The digital electronic device of claim 1, wherein the region statistics comprise values representing the amount of light acquired by the pixels.

19. The digital electronic device of claim 1, wherein the Image Signal Processor is configured with computerized instructions comprising instructions to:
receive a request from the requester to provide the region statistics associated with the regions of the digital image;
upon receiving the request to provide the region statistics, sending the region statistics to the requester.

20. The digital electronic device of claim 19, wherein the Image Signal Processor is configured with computerized instructions comprising instructions to:
receive a request to provide the hot region map to the requester;
send the hot region map to the requester.

* * * * *